(12) United States Patent
Kondo et al.

(10) Patent No.: US 10,889,318 B2
(45) Date of Patent: Jan. 12, 2021

(54) STEERING DEVICE

(71) Applicant: JTEKT CORPORATION, Osaka (JP)

(72) Inventors: Yoshio Kondo, Okazaki (JP); Masashi Yamaguchi, Toyota (JP)

(73) Assignee: JTEKT CORPORATION, Osaka (JP)

( * ) Notice: Subject to any disclaimer, the term of this patent is extended or adjusted under 35 U.S.C. 154(b) by 213 days.

(21) Appl. No.: 16/173,163

(22) Filed: Oct. 29, 2018

(65) Prior Publication Data

US 2019/0161111 A1 May 30, 2019

(30) Foreign Application Priority Data

Nov. 24, 2017 (JP) ................................. 2017-226174
Dec. 18, 2017 (JP) ................................. 2017-241958

(51) Int. Cl.
| | |
|---|---|
| *B62D 5/04* | (2006.01) |
| *F16C 33/60* | (2006.01) |
| *F16C 19/18* | (2006.01) |
| *F16C 1/00* | (2006.01) |

(Continued)

(52) U.S. Cl.
CPC ......... *B62D 5/0448* (2013.01); *B62D 5/0424* (2013.01); *B62D 5/0463* (2013.01); *F16C 1/00* (2013.01); *F16C 19/184* (2013.01); *F16C 33/60* (2013.01); *F16C 19/08* (2013.01); *F16C 2326/24* (2013.01); *F16H 2025/2436* (2013.01)

(58) Field of Classification Search
CPC .................................................. B62D 5/0448
See application file for complete search history.

(56) References Cited

U.S. PATENT DOCUMENTS

| | | | |
|---|---|---|---|
| 3,317,258 A | 5/1967 | Hermann | |
| 2007/0102229 A1* | 5/2007 | Murakami | ............ F16C 19/184 |
| | | | 180/444 |

(Continued)

FOREIGN PATENT DOCUMENTS

| | | |
|---|---|---|
| DE | 3842717 A1 | 6/1990 |
| EP | 1880920 A1 | 1/2008 |

(Continued)

OTHER PUBLICATIONS

May 23, 2019 partial European Search Report issued in European Application No. 18206286.9.

(Continued)

*Primary Examiner* — Tony H Winner
(74) *Attorney, Agent, or Firm* — Oliff PLC

(57) ABSTRACT

A steering device includes a rolling-element bearing that rotationally supports a rotating member in a housing. The rolling-element bearing includes an inner ring, an outer ring, first rolling elements, and second rolling elements. The first rolling elements and second rolling elements are disposed in parallel in the axial direction between the inner ring and the outer ring. The inner ring includes a first split race having a first inner peripheral track surface and a second split race having a second inner peripheral track surface. The steering device further includes a fixing structure configured to fix the rolling-element bearing to the outer periphery of the rotating member in a state where a load is applied to the first split race, the first rolling element, the outer ring, the second rolling element, and the second split race.

11 Claims, 8 Drawing Sheets

(51) Int. Cl.
*F16H 25/24* (2006.01)
*F16C 19/08* (2006.01)

(56) References Cited

U.S. PATENT DOCUMENTS

| | | | | |
|---|---|---|---|---|
| 2012/0061164 A1* | 3/2012 | Budaker | .............. | B62D 5/0448 |
| | | | | 180/400 |
| 2014/0260728 A1* | 9/2014 | Holm | .................... | F16C 35/063 |
| | | | | 74/89.23 |
| 2014/0345966 A1* | 11/2014 | Asakura | ................ | F16C 25/083 |
| | | | | 180/444 |
| 2016/0075368 A1* | 3/2016 | Watanabe | ............ | B62D 5/0424 |
| | | | | 180/444 |
| 2017/0343088 A1* | 11/2017 | Asakura | ............... | B62D 5/0424 |

FOREIGN PATENT DOCUMENTS

| | | |
|---|---|---|
| JP | H08-67109 A | 3/1996 |
| JP | 4773653 B2 | 9/2011 |
| JP | 2012-117648 A | 6/2012 |
| JP | 2014-234103 A | 12/2014 |
| WO | 89/01101 A1 | 2/1989 |
| WO | 2013/100285 A1 | 7/2013 |
| WO | 2014/115914 A1 | 7/2014 |

OTHER PUBLICATIONS

Aug. 27, 2019 extended European Search Report issued in European Patent Application No. 18206286.9.

* cited by examiner

STEERING DEVICE

BACKGROUND

The present disclosure relates to a steering device.

Conventionally, a steering device for a vehicle includes an electric power steering device (EPS) that applies an assisting force to a steering mechanism by a motor. Such an EPS includes a rotating member that is rotated by a motor and to which a rack shaft is inserted. The EPS applies the assisting force to the steering mechanism by converting rotation of the rotating member into a reciprocating motion of the rack shaft by the ball screw mechanism. For example, Japanese Laid-Open Patent Publication No. 2014-234103 discloses an EPS that is one component of a ball screw mechanism, and in which a ball screw nut, which functions as a rotating member, is rotationally supported in a housing via a rolling-element bearing.

The EPS of the above publication employs a double row angular contact ball bearing as a rolling-element bearing. The inner ring of such a rolling-element bearing is divided into two split races at the axial center position. The second split race of the two split races is adjacent to and in contact with a flange member provided on the outer periphery of the ball screw nut. The first split race of the two split races is pressed against the second split race by a lock nut screwed to the outer periphery of the ball screw nut. As a result, preload is applied to the rolling-element bearing such that its internal clearance has a preset size.

Even if the torque (tightening torque) when fastening the lock nut to the outer periphery of the ball screw nut is constant, the fastening position of the lock nut may be changed due to the influence of the frictional force between, for example, the lock nut and the first split race. Therefore, the compressive load in the axial direction acting on the rolling-element bearing may vary for each individual (product) to be manufactured. As a result, the load acting from the lock nut on the first split race, the rolling element, the outer ring, and the second split race varies so that there is a possibility that the internal clearance may vary, and there is still room for improvement in this respect.

Such a problem is not limited to the case where the ball screw nut is supported by the rolling-element bearing. For example, the same problem may occur when another rotating member such as a pulley is supported that is fitted to the outer periphery of the ball screw nut to be integrally rotational and transmits a rotation of the motor to the ball screw nut.

SUMMARY

An objective of the present disclosure is to provide a steering device capable of limiting variations in internal clearance of a rolling-element bearing.

In accordance with one aspect of the present disclosure, a steering device configured to apply an assisting force to a steering mechanism by a motor is provided. The steering device includes a housing, a steering rod accommodated in the housing to be allowed to reciprocate in an axial direction, a power transmission mechanism, which includes a rotating member configured to rotate by the motor and is configured to convert a rotation of the rotating member into a reciprocating motion of the steering rod thereby to transmit the reciprocating motion to the steering rod, and a rolling-element bearing, which rotationally supports the rotating member in the housing. The rolling-element bearing includes an inner ring, an outer ring, first rolling elements, and second rolling elements. The first rolling elements and the second rolling elements are disposed side by side in an axial direction between the inner ring and the outer ring. The inner ring includes a first split race having a first inner peripheral track surface, on which the first rolling elements roll, and a second split race having a second inner peripheral track surface, on which the second rolling elements roll. The steering device further includes a fixing structure configured to fix the rolling-element nearing to an outer periphery of the rotating member in a state where a load in the axial direction is applied to the first split race, the first rolling elements, the outer ring, the second rolling elements, and the second split race.

Other aspects and advantages of the present disclosure will become apparent from the following description, taken in conjunction with the accompanying drawings, illustrating exemplary embodiments.

BRIEF DESCRIPTION OF THE DRAWINGS

The disclosure may be understood by reference to the following description together with the accompanying drawings.

DETAILED DESCRIPTION

First Embodiment

A steering device according to a first embodiment will now be described with reference to FIGS. 1 to 25. In the first embodiment, the steering device is embodied as an electric power steering device (EPS).

Figure 1:
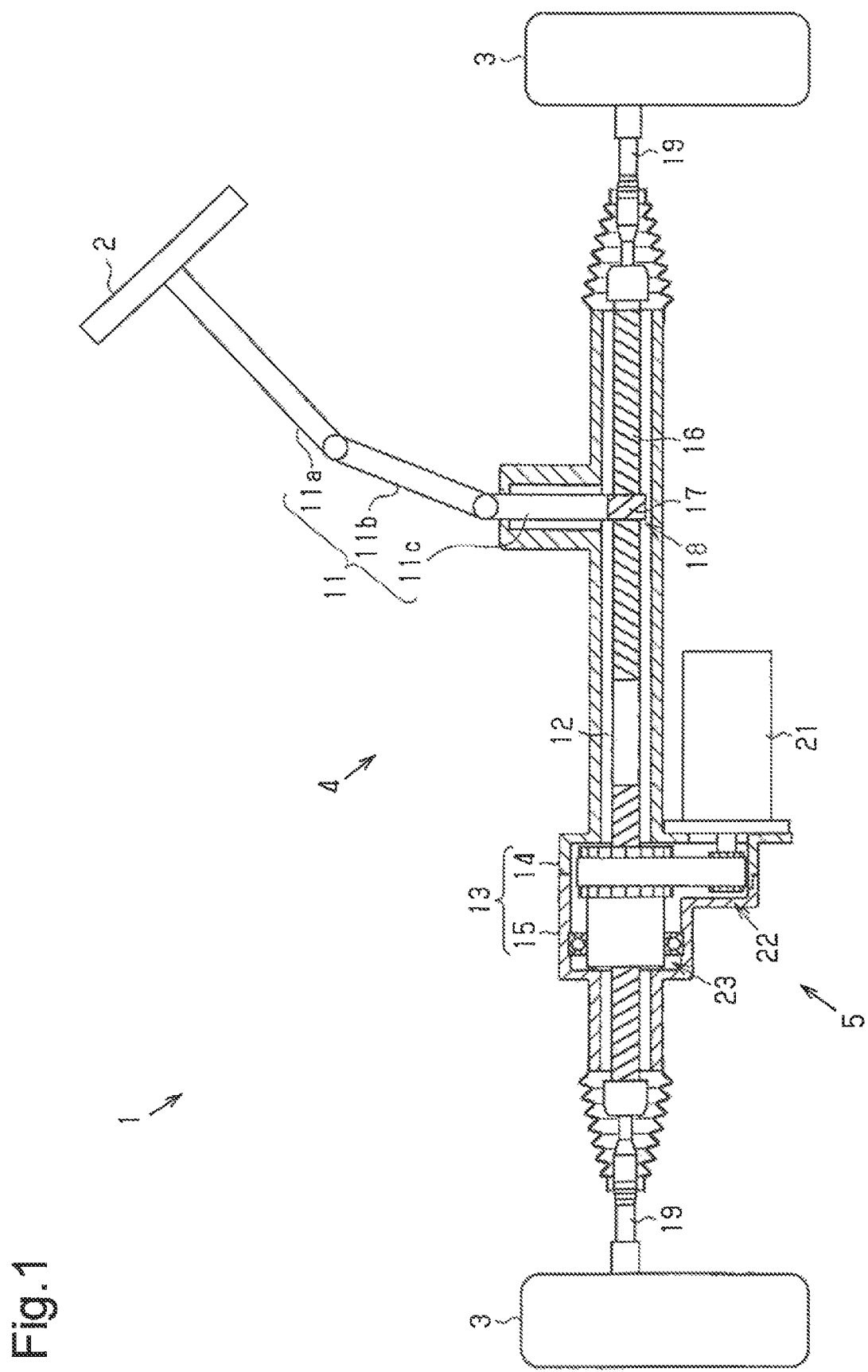
FIG. 1 is a schematic configuration diagram of an electric power steering device according to a first embodiment.

As shown in FIG. 1 an EPS 1 includes a steering mechanism 4 and an actuator 5. The steering mechanism 4 steers a steerable wheel 3 based on the operation of a steering wheel 2 by the driver. The actuator 5 generates an assisting force for assisting a steering operation.

The steering mechanism 4 includes a steering shaft 11, a rack shaft 12 as a steering rod, and a rack housing 13 as a housing. The steering wheel 2 is fixed to the steering shaft 11. The rack shaft 12 reciprocates in the axial direction in accordance with the rotation of the steering shaft 11. The rack shaft 12 is inserted through the rack housing 13 to be allowed to reciprocate. The steering shaft 11 is configured by connecting a column shaft 11a, an intermediate shaft 11b, and a pinion shaft 11c in order from the side on which the steering wheel 2 is located. Further, the steering mechanism 4 includes a rack-and-pinion mechanism 18 that converts the rotation of the steering shaft 11 into a reciprocating motion of the rack shaft 12.

The rack housing 13 is configured by connecting a first housing 14 and a second housing 15. The first housing 14 and the second housing 15 are formed in a tubular shape. The rack shaft 12 and the pinion shaft lie constituting the rack-and-pinion mechanism 18 are disposed within the first housing 14 at a predetermined intersecting angle. Rack teeth 16 formed on the rack shaft 12 and pinion teeth 17 formed on the pinion shaft 11c are engaged. Tie rods 19 are connected to the opposite ends of the rack shaft 12. Each of the tips of the tie rods 19 is connected to a knuckle (not shown) to which the steerable wheel 3 is attached. Therefore, in the EPS 1, the rotation of the steering shaft 11 accompanying the steering operation is converted into the axial movement of the rack shaft 12 by the rack-and-pinion mechanism 18. In the EPS 1, this axial movement is transmitted to the knuckle via the tie rod 19, so that the steered angle of the steerable wheel 3, that is, the traveling direction of the vehicle, is changed.

The actuator 5 includes a motor 21 as a drive source, a belt mechanism 22 for transmitting the rotation of the motor 21, and a ball screw mechanism 23 that converts the rotation transmitted through the belt mechanism 22 into the reciprocating motion of the rack shaft 12. The actuator 5 is provided at a connecting portion between the first housing 14 and the second housing 15. The actuator 5 transmits the rotation of the motor 21 to the ball screw mechanism 23 via the belt mechanism 22, and converts it into the reciprocating motion of the rack shaft 12 by the ball screw mechanism 23. As a result, the actuator 5 applies an assisting force to the steering mechanism 4. That is, in the first embodiment, the belt mechanism 22 and the ball screw mechanism 23 constitute a power transmission mechanism.

Next, the configuration of the actuator 5 will be described in detail. For illustrative purposes, the right side of FIGS. 2A and 2B will be referred to as an axial first end side and the left side of FIGS. 2A and 2B will be referred to as an axial second end side.

Figure 2A:
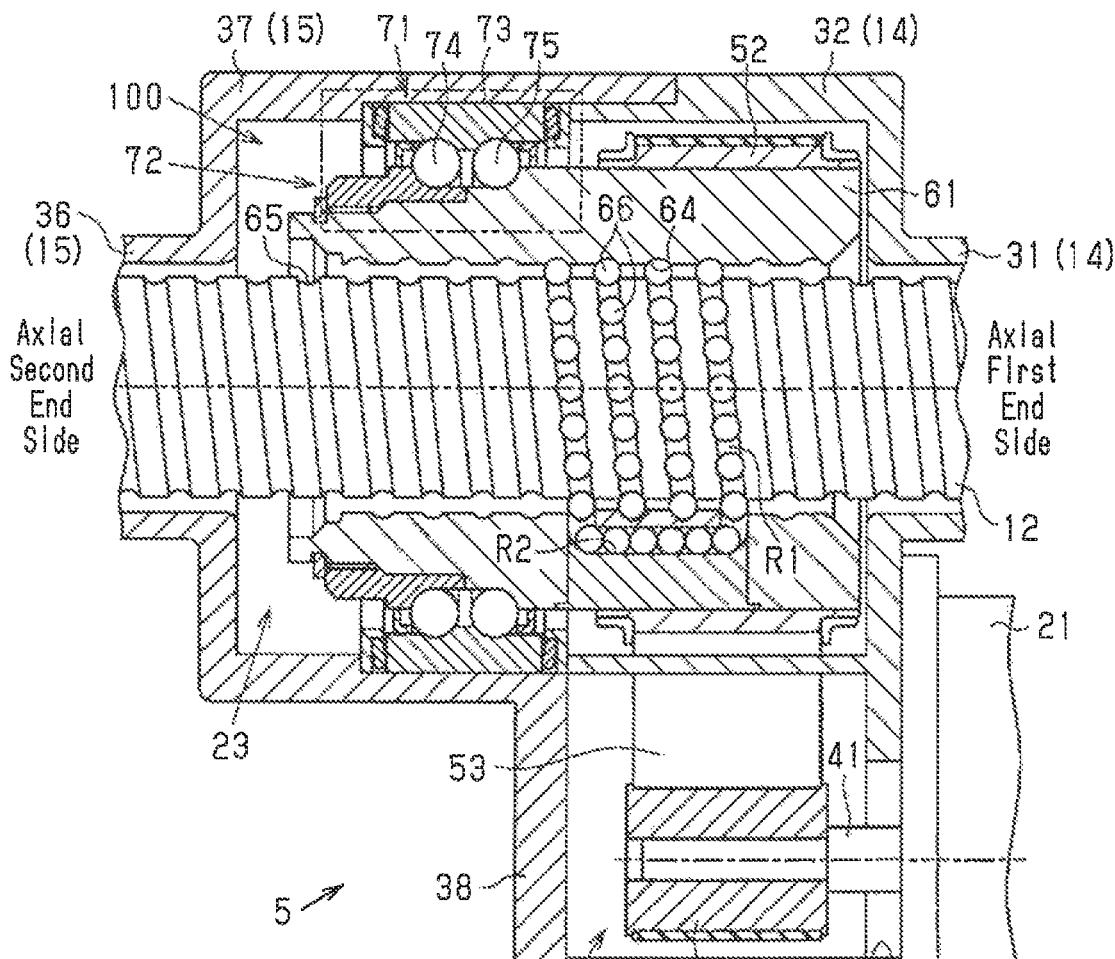
FIG. 2A is a cross-sectional view along the axial direction of a rack shaft in the vicinity of an actuator in the first embodiment.

As shown in FIG. 2A, the first housing 14 includes a first tubular portion 31 and a first accommodating portion 32 formed on the axial second end side of the first tubular portion 31. The first tubular portion 31 has a peripheral wall with a circular cross section. The first accommodating portion 32 is formed in a tubular shape having a larger diameter than the first tubular portion 31. In the first accommodating portion 32, a bulging portion 33 having a shape in which part of its peripheral wall is bulged toward the space in which the motor 21 is disposed (lower side in FIG. 2A) is formed. An insertion hole 34 penetrating in the axial direction of the rack shaft 12 is formed on the end wall of the bulging portion 33.

The second housing 15 includes a second tubular portion 36 and a second accommodating portion 37 formed on the axial first end side of the second tubular portion 36. The second tubular portion 36 has a peripheral wall with a circular cross section. The second accommodating portion 37 is formed in a tubular shape having a larger diameter than the second tubular portion 36. The second accommodating portion 37 is provided with a cover portion 38 for covering the bulging portion 33 of the first housing 14.

A rotating shaft 41 of the motor 21 is inserted into the bulging portion 33 via the insertion hole 34. The motor 21 is fastened to the first housing 14 (the rack housing 13) via a bolt 42 in a position in which the rotating shaft 41 is parallel to the rack shaft 12.

The belt mechanism 22 includes a driving pulley 51, a driven pulley 52, and a belt 53 looped over the driving pulley 51 and the driven pulley 52. The driving pulley 51 is formed in a tubular shape. The driving pulley 51 is coaxially connected to the rotating shaft 41 of the motor 21 so as to be rotatable together. The driven pulley 52 is formed in a tubular shape. The driven pulley 52 is rotationally disposed on the outer periphery of the rack shaft 12 at a position in the axial direction same as that of the driving pulley 51. The belt 53 is made of an elastic material such as rubber. The belt 53 generates a predetermined tension between the driving pulley 51 and the driven pulley 52.

The ball screw mechanism 23 is provided with a tubular ball screw nut 61. The ball screw nut 61 is coaxial with the rack shaft 12 and disposed on the outer periphery of the rack shaft 12. The axial first end side of the ball screw nut 61 is fitted to the inner periphery of the driven pulley 52 and is coupled to the driven pulley 52 so as to be rotatable together with the driven pulley 52. The axial second end side of the ball screw nut 61 is rotationally supported in the second accommodating portion 37 via a rolling-element bearing 71 to be described later. That is, in the first embodiment, the ball screw nut 61 corresponds to a rotating member.

A screw groove 64 is formed on the inner periphery of the ball screw nut 61. On the other hand, a screw groove 65 corresponding to the screw groove 64 is formed on the outer periphery of the rack shaft 12. A helical ball track R1 is formed by causing the screw grooves 64, 65 to face each other. In the ball track R1, balls 66 are disposed in a state where the balls 66 are held by the screw groove 64 and the screw groove 65. That is, the ball screw nut 61 is threadedly engaged with the outer periphery of the rack shaft 12 via the balls 66.

As a result, each ball 66 rolls in the ball track R1 while receiving a load (frictional force) in accordance with the relative rotation between the rack shaft 12 and the ball screw nut 61 (driven pulley 52). As the relative position in the axial direction between the rack shaft 12 and the ball screw nut 61 is displaced by rolling of each ball 66, the torque of the motor 21 is applied to the steering mechanism 4 as an assisting force. The balls 66 rolling in the ball track R1 circulate endlessly by passing through a circulation path R2. The circulation path R2 short-circuits between the two points of the ball track R1 provided in the ball screw nut 61.

Next, the supporting structure of the ball screw nut 61 by the rolling-element bearing 71 will be described.

Figure 2B:
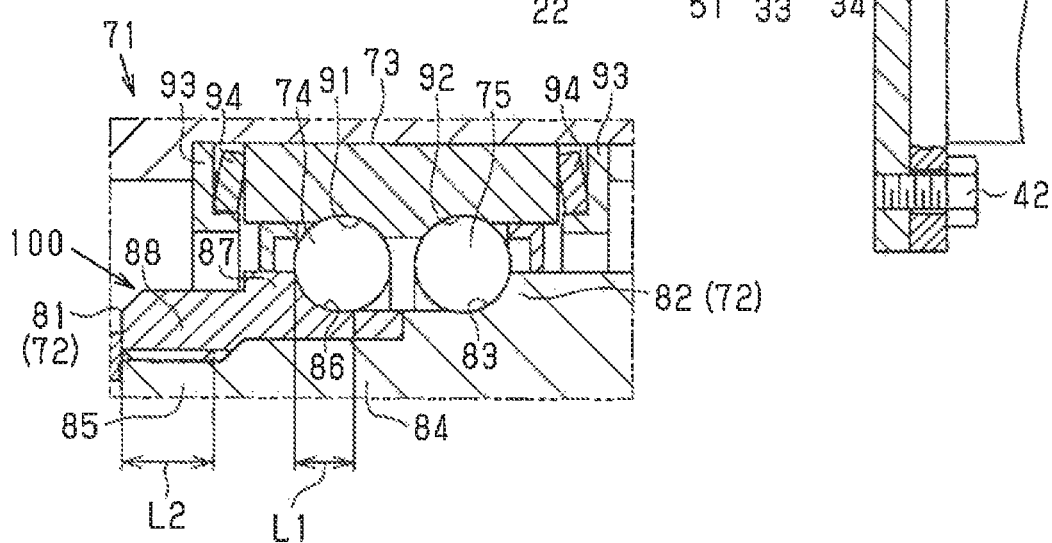
FIG. 2B is an enlarged cross-sectional view of the vicinity of a rolling-element bearing of FIG. 2A.

As shown in FIGS. 2A and 2B, a double row angular contact ball bearing is employed as a rolling-element bearing 71. The rolling-element bearing 71 includes an inner ring 72, an outer ring 73, and first rolling elements 74 and second rolling elements 75 disposed in parallel in the axial direction between the inner ring 72 and the outer ring 73. The rolling-element bearing 71 is fixed to the outer periphery of the ball screw nut 61 in a state where a preload is applied so that the internal clearance thereof has a preset size.

Specifically, the inner ring 72 of the first embodiment includes a first split race 81 and a second split race. The second split race is formed integrally with the ball screw nut 61. That is, the ball screw nut 61 integrally includes a second split race portion 82 functioning as the second split race. The ball screw nut 61 has the second split race portion 82, a fitting portion 84, and an external thread portion 85. The second split race portion 82 is formed at a portion of the ball screw nut 61 on the axial second end side with relative to the axial center. A second inner peripheral track surface 33 is formed around the entire circumference of the ball screw nut. 81 on the outer periphery of the second split race portion 82. The plurality of second rolling elements 75 rolls on the second inner peripheral track surface 83. The second inner peripheral track surface 83 has an outer diameter that decreases toward the axial second end, and forms a groove having an arcuate cross section. The second split race portion 82 has a tubular portion extending from the portion forming the second inner peripheral track surface 83 toward the axial second end. The outer diameter of the tubular portion is constant in the axial direction and is substantial equal to the smallest outer diameter of the second inner peripheral track surface 83.

The fitting portion 84, which continue to the second split race portion 82, extends toward the axial second end. The fitting portion 84 is formed in a tubular shape having a constant outside diameter. The outer diameter of the fitting portion 84 is set to be smaller than the smallest outer diameter of the second inner peripheral track surface 83.

The external thread portion 85, which continues to the fitting portion 84, extends toward the axial second end. The external thread portion. 85 is formed in a tubular shape. Screw threads are formed on the outer peripheral surface of the external thread portion 85.

The first split race 81 is formed in a substantially tubular shape. The first split race 81 includes a track surface forming portion 87 having a first inner peripheral track surface 86 and an internal thread portion 88 formed continuously toward the axial second end of the track surface forming portion 87. The plurality of first rolling elements 74 rolls on the first inner peripheral track surface 86. The first inner peripheral track surface 86 and the second inner peripheral track surface 83 are formed symmetrically with respect to a straight line orthogonal to the axial direction. That is, the first inner peripheral track surface 86 has an outer diameter which increases as it goes toward the axial second end, forming a groove having an arcuate cross section. The first split race 81 has a tubular portion extending from the portion forming the first inner peripheral track surface 86 toward the axial first end portion. The outer diameter of this tubular portion is constant in the axial direction and is substantially equal to the smallest outer diameter of the first inner peripheral track surface 86. The inner diameter of the track surface forming portion 87 is set to be substantially equal to the outer diameter of the fitting portion 84. The outer peripheral surface of the internal thread portion 88 is formed in a polygonal shape such that a tool or the like can engage in the circumferential direction. A thread groove is formed on the inner peripheral surface of the internal thread portion 88 so that the screw threads of the external thread portion 85 are engaged thereinto.

As shown in FIG. 2B, the first split race 81 is formed such that an axial range L1 where the first inner peripheral track surface 86 is present and an axial range L2 where the internal thread portion 88 is present do not overlap with each other in the axial direction. The axial length of the track surface forming portion 87 is set to be substantially equal to the axial length of the fitting portion 84. The axial length of the internal thread portion 88 is set to be substantially equal to the axial length of the external thread portion 85.

The outer ring 73 is formed in a tubular shape. A first outer peripheral track surface 91 is formed on the axial second end side of the outer ring 73. The plurality of first rolling elements 74 rolls on the first outer peripheral track surface 91. A second outer peripheral track surface 92 is formed on the axial first end side of the outer ring 73. The plurality of second rolling elements 75 rolls on the second outer peripheral track surface 92. The first outer peripheral track surface 91 and the second outer peripheral track surface 92 are formed symmetrically with respect to each other across the axial center portion of the outer ring 73. Specifically, the first outer peripheral track surface 91 has an inner diameter that increases from the axial center portion of the outer ring 73 toward the axial second end, and forms a groove having an arcuate cross section. The second outer peripheral track surface 92 has an inner diameter which increases from the axial center portion of the outer ring 73 toward the axial first end portion and forms a groove having an arcuate cross section. The outer ring 73 has a tubular portion extending from the portions forming the first and second outer peripheral track surfaces 91 and 92 in the axial direction. The inner diameter of these tubular portions is constant in the axial direction and is substantially equal to the largest inner diameter of the first and second outer peripheral track surfaces 91 and 92.

A retainer 93 having an L-shaped cross section is disposed adjacent to each of both ends of the outer ring 73 in the axial direction. A resilient body 94 such as a Belleville spring and rubber are compressed in each retainer 93. As a result, the outer ring 73 is elastically supported in a state of being displaceable in the axial direction with respect to the rack housing 13. The outer ring 73 may be rigidly supported by the rack housing 13 without providing the retainer 93 and the resilient body 94.

The first split race 81 is fixed to the ball screw nut 61 such that the internal thread portion 88 is screwed to the external thread portion 85 so as to be disposed side by side on the axial second end side of the second split race portion 82. The outer ring 73 is disposed so as to face the first split race 81 and the second split race portion 82 in the radial direction. Each of the first rolling elements 74 is composed of a spherical ball. Each of the first rolling elements 74 is sandwiched between the two track surfaces 86 and 91 in a state where the first rolling elements 74 can roll in the circumferential direction within the rolling path formed by the first inner peripheral track surface 86 and the first outer peripheral track surface 91 facing each other. Each of the second rolling elements 75 is composed of a spherical ball. Each of the second rolling elements 75 is sandwiched between the two track surfaces 83 and 92 in a state where the second rolling elements 75 can roll in the circumferential direction in the rolling path formed by the second inner peripheral track surface 83 and the second outer peripheral track surface 92 which face each other. The first split race 81 is screwed to the outer periphery of the ball screw nut 61 with a predetermined constant tightening torque, whereby a load is applied to the rolling-element bearing 71 in the axial direction. As a result, the rolling-element bearing 71 is fixed to the outer periphery of the ball screw nut 61 in a state where a load is applied from the first split race 81 to the first rolling elements 74, the outer ring 73, the second rolling elements 75, and the second split race portion 82 so that the internal clearance has a predetermined size. In the first embodiment, a fixing structure 100 for fixing the inner ring 72 to the outer periphery of the ball screw nut 61 is composed of the internal thread portion 88 and the external thread portion 85.

Operations and advantages of the first embodiment will now be described.

(1) By forming the internal thread portion 88 in the first split race 81, a portion for fixing the rolling-element bearing 71 (inner ring 72) is integrated with the rolling-element bearing 71. Therefore, unlike the case where, for example, the frictional force between a lock nut for fixing as a separate part and a rolling-element bearing exerts influence, it is possible to prevent the fastening position of the first split race 81 from shifting by tightening with a constant tightening torque. As a result, variations in the load acting on the first rolling elements 74, the outer ring 73, the second rolling elements 75, and the second split race portion 82 from the first split race 81 can be limited, and it is possible to prevent the internal clearance of the rolling-element bearing 71 from varying. Further, the number of parts can be reduced as compared with a case where the first split race is fixed by a lock nut made of a separate member, for example.

(2) The second split race portion 82 having the second inner peripheral track surface 83 is integrally provided on the ball screw nut 61, and the inner ring 72 of the rolling-element bearing 71 is configured by the first split race 81 and the second split race portion 82. Therefore, the number of parts can be reduced as compared with the case where the second split race is formed separately from the ball screw nut 61. Further, since the second split race portion 82 is provided integrally with the ball screw nut 61, the axial center of the second split race portion 82 can be accurately matched with the axial center of the ball screw nut 61. As a result, eccentricity of the second split race portion 82 can be limited, and rotation fluctuation caused by the eccentricity can be limited.

(3) The first split race 81 is formed so that the axial range L1, in which the first inner peripheral track surface 86 is present, and the axial range L2, in which the internal thread portion 88 is present, do not overlap with each other in the axial direction. Therefore, it is difficult for the first inner peripheral track surface 86 to have distortion generated when the first split race 81 is fastened to the outer periphery of the ball screw nut 61. As a result, variations in the internal clearance can be further limited.

Second Embodiment

A steering device according to a second embodiment will now be described with reference to FIGS. 3A to 3B. For illustrative purposes, the same reference numerals are given to those components that the same as the corresponding components of the first embodiment and detailed explanations are omitted.

Figure 3A:
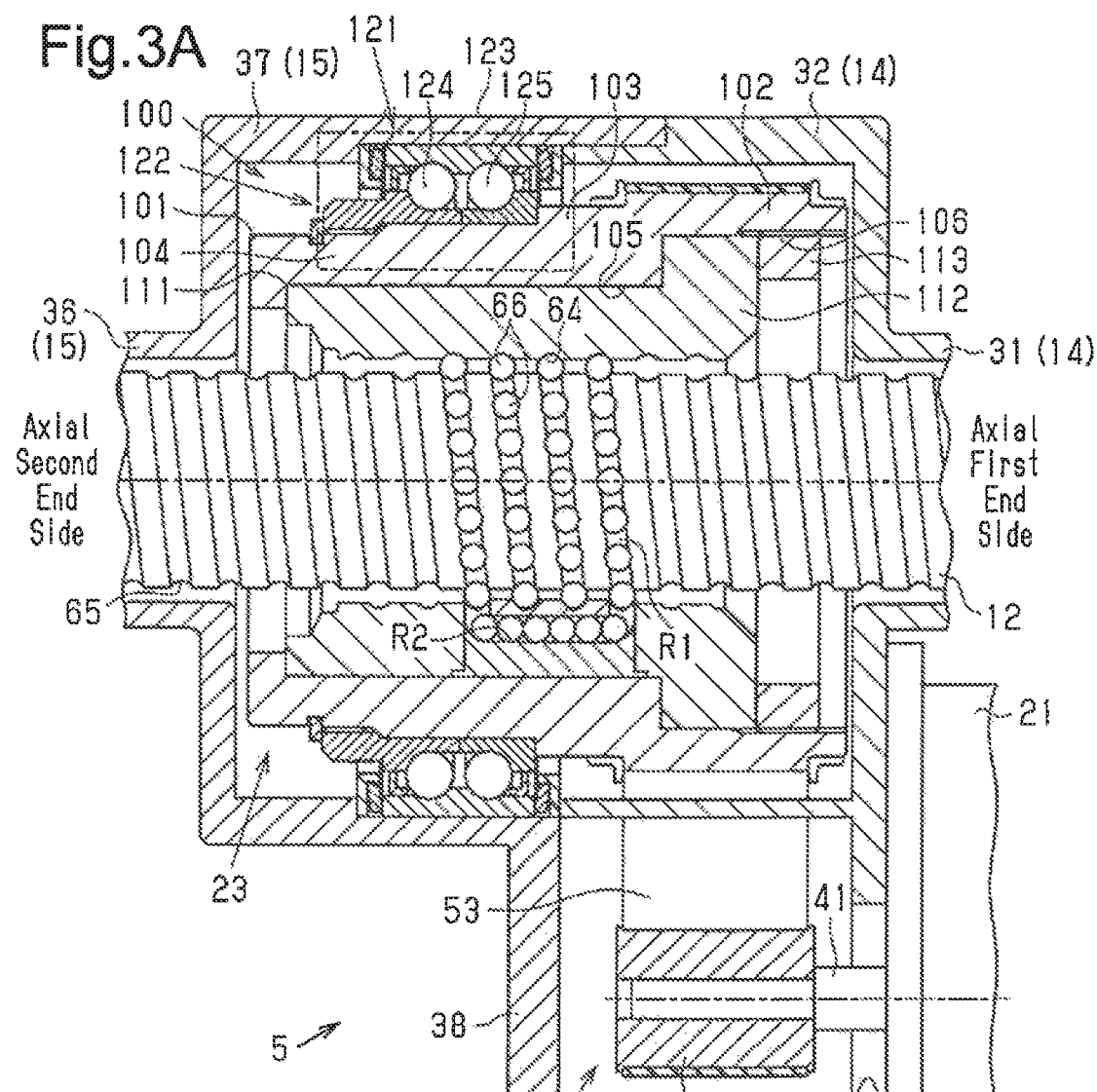
FIG. 3A is a cross-sectional view along the axial direction of a rack shaft in the vicinity of an actuator in a second embodiment.

As shown in FIG. 3A, a driven pulley 101 of the second embodiment is formed in a tubular shape. The driven pulley 101 includes a belt receiving portion 102, an extending portion 103, and an external thread portion 104. The belt 53 is looped over the belt receiving portion 102. The extending portion 103 extends from the belt receiving portion 102 toward the axial second end and is stepped with the outer diameter on the axial second end side in the axial direction being smaller than the outer diameter on the axial first end side in the middle thereof. Further, the external thread portion 104 extends from the extending portion 103 toward the axial second end. Screw threads are formed on the outer periphery of the external thread portion 104. Further, on the inner periphery of the driven pulley 101, a fitting hole portion 105 having a tubular inner peripheral surface, and an enlarged diameter hole portion 106 provided on the axial first end side relative to the fitting hole portion 105 is formed. The enlarged diameter hole portion 106 has an inner diameter larger than the fitting hole portion 105. A thread groove is formed on the inner periphery of the enlarged diameter hole portion 106. The driven pulley 101 is rotationally supported in the second accommodating portion 37 via a rolling-element bearing 121. That is, in the second embodiment, the driven pulley 101 corresponds to a rotating member. The rolling-element bearing 121 is disposed across the outer periphery of the extending portion 103 and the external thread portion 104 as described later.

An annular flange portion 112 extending radially outward is formed on the axial first end side of a ball screw nut 111 of the second embodiment. The ball screw nut 111 is fitted to the inner periphery of the driven pulley 101. A lock nut 113 is screwed to the enlarged diameter hole portion 106. The ball screw nut 111 is fixed to the driven pulley 101 so as to be integrally rotatable by the flange portion 112 being pressed against the step portion between the fitting hole portion 105 and the enlarged diameter hole portion 106 by the lock nut 113.

Next, the supporting structure of the driven pulley 101 by the rolling-element bearing 121 will be described.

Figure 3B:
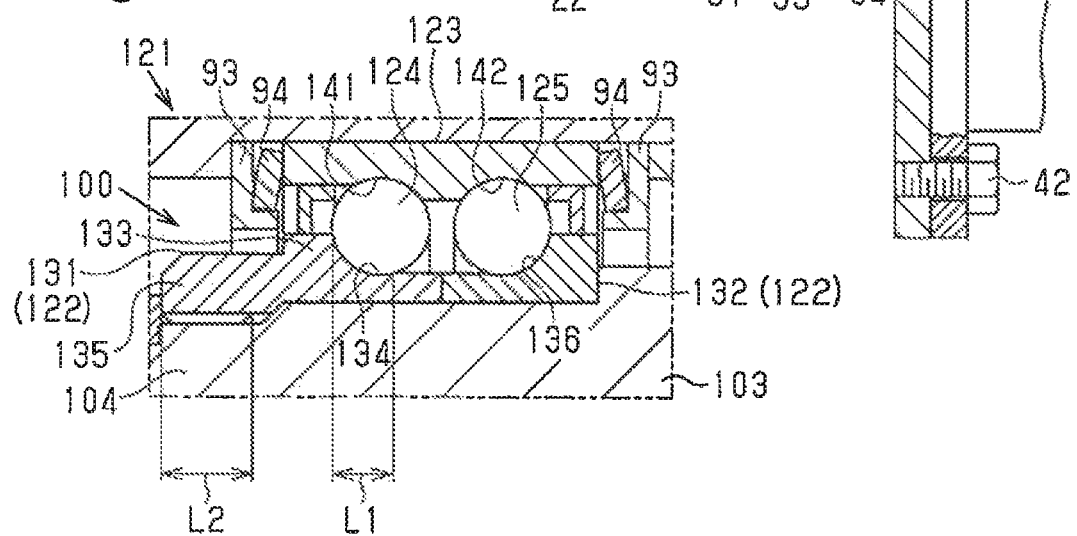
FIG. 3B is an enlarged cross-sectional view of the vicinity of the rolling-element bearing of FIG. 3A.

As shown in FIGS. 3A and 3B, a double row angular contact ball bearing is employed as the rolling-element bearing 121. The rolling-element bearing 121 includes an inner ring 122, an outer ring 123, and first rolling elements 124 and second rolling elements 125 disposed in parallel in the axial direction between the inner ring 122 and the outer ring 123. The rolling-element bearing 121 is fixed to the outer periphery of the driven pulley 101 in a state where a preload is applied so that the internal clearance thereof has a preset size.

Specifically, the inner ring 122 includes a first split race 131 disposed on the axial second end side and a second split race 132 disposed on the axial first end side. The first split race 131 includes a track surface forming portion 133, a first inner peripheral track surface 134, and an internal thread portion 135, and is formed in the manner same as the first split race 81 of the first embodiment. The second split race 132 is formed in a tubular shape. A second inner peripheral track surface 136 is formed on the outer periphery of the second split race 132. The second inner peripheral track surface 136 and the first inner peripheral track surface 134 are formed symmetrically with respect to a straight line orthogonal to the axial direction. That is, the first inner peripheral track surface 134 has an outer diameter which increases as it goes toward the axial second end, forming a groove having an arcuate cross section. The second split race 132 has a tubular portion extending from the portion forming the second inner peripheral track surface 136 toward the axial second end. The outer diameter of this tubular portion is constant in the axial direction and is substantially equal to the smallest outer diameter of the second inner peripheral track surface 136.

The outer ring 123 has first and second outer peripheral track surfaces 141, 142 and is formed in the manner same as the outer ring 73 of the first embodiment. Similarly to the first embodiment, each of the first rolling elements 124 and second rolling elements 125 is formed of a spherical ball.

The second split race 132 is fitted to the outer periphery of the driven pulley 101 from the axial second end side so as to contact the step of the extending portion 103. The first split race 131 is fixed to the ball screw nut 61 such that the internal thread portion 135 is screwed to the external thread portion 104 of the driven pulley 101 so as to be arranged side by side on the axial second end side of the second split race 132. The outer ring 123 is disposed so as to face the first and second split races 131, 132 in the radial direction. Each of the first rolling elements 124 is sandwiched between the two track surfaces 134 and 141 in a state where the first rolling elements 124 can roll in the circumferential direction in the rolling path formed by the first inner peripheral track surface 134 and the first outer peripheral track surface 141 which face each other. Each of the second rolling elements 125 is sandwiched between the two track surfaces 136 and 142 in a state where the second rolling elements 125 can roll in the circumferential direction in the rolling path formed by the second inner peripheral track surface 136 and the second outer peripheral track surface 142 which face each other. The first split race 131 is screwed to the outer periphery of the ball screw nut 111 with a predetermined constant tightening torque, whereby a load is applied to the rolling-element bearing 121 in the axial direction. As a result, the rolling-element bearing 121 is fixed to the outer periphery of the driven pulley 101 in a state where a load is applied to the first rolling elements 124, the outer ring 123, the second rolling elements 125, and the second split race 132 from the first split race 131 so that the internal clearance has a predetermined size. In the second embodiment, the fixing structure 100 for fixing the inner ring 122 to the outer periphery of the driven pulley 101 is composed of the internal thread portion 135 and the external thread portion 104.

The second embodiment achieves the same operations and advantages as the items (1) and (3) of the first embodiment.

Third Embodiment

A steering device according to a third embodiment will now be described with reference to FIGS. 4 to 6. For illustrative purposes, the same reference numerals are given to those components that the same as the corresponding components of the first embodiment and detailed explanations are omitted.

In the following description, "axial direction" refers to the axial direction of the rack shaft 12, "radial direction" refers to the direction orthogonal to "axial direction" and "circumferential direction" refers to the rotation direction around the axis m of the rack shaft 12.

Figure 4:
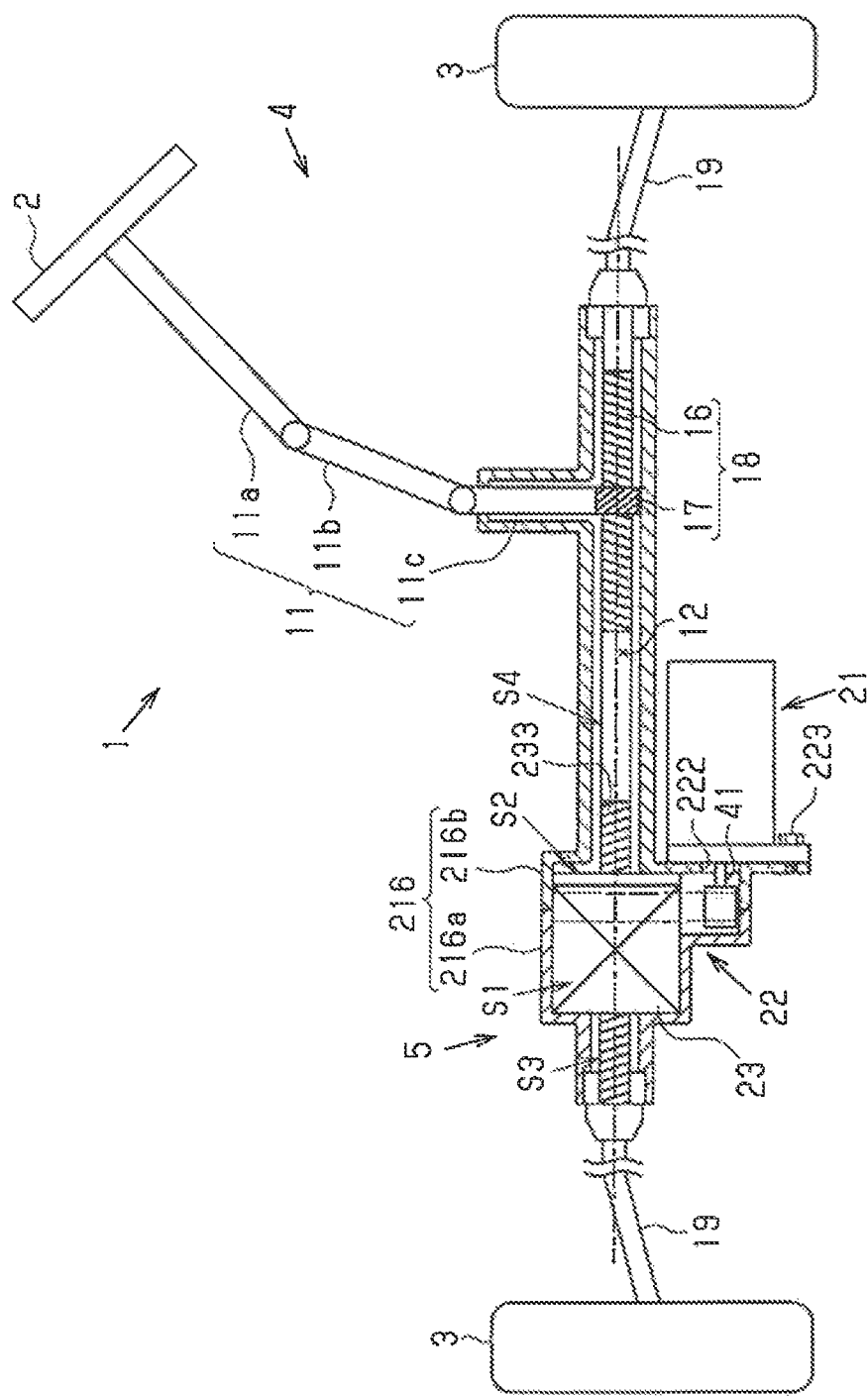
FIG. 4 is a schematic configuration diagram of an electric power steering device according to a third embodiment.

As shown in FIG. 4, the actuator 5 is provided around the rack shaft 12. The actuator 5 includes the motor 21 having the rotating shaft 41, the ball screw mechanism 23, and the belt mechanism 22 for transmitting the rotational force of the rotating shaft 41 of the motor 21 to the ball screw mechanism 23. The actuator 5 converts the rotational force of the motor 21 into an axial force that causes the rack shaft 12 to reciprocate in the axial direction via the belt mechanism 22 and the ball screw mechanism 23. An axial force along the axis m applied to the rack shaft 12 serves as an assisting force to assist the driver in operating the steering wheel 2. That is, in the third embodiment, the belt mechanism 22 and the ball screw mechanism 23 constitute a power transmission mechanism. It should be noted that the tie rod 19 is attached with an angle to the axis m of the rack shaft 12.

The rack shaft 12, the ball screw mechanism 23, the belt mechanism 22, and part of the pinion shaft 11c are accommodated in a housing 216. The housing 216 is formed by connecting a first housing 216a and a second housing 216b which are divided in the axial direction. The first housing 216a includes a first accommodating portion S1 for accommodating the actuator 5 and a first tubular portion S3. The first tubular portion S3 communicates with the first accommodating portion S1 and extends toward the side opposite to the rack-and-pinion mechanism 18. The second housing 216b includes a second accommodating portion S2 for accommodating the actuator 5 and a second tubular portion S4. The second tubular portion S4 communicates with the second accommodating portion S2 and extends to the position where the rack-and-pinion mechanism 18 is disposed.

In a state where the first housing 216a and the second housing 216b are coupled to each other, the rack shaft 12 is accommodated inside the first accommodating portion S1, the first tubular portion S3, the second accommodating portion S2, and the second tubular portion S4.

A through hole 222 is provided in the outer wall (the right side wall in the figure) of the second accommodating portion S2. The rotating shaft 41 of the motor 21 is accommodated inside the second housing 216b through the through hole 222. The motor 21 is fixed to the second housing 216b by a bolt 223. The rotating shaft 41 is parallel to the rack shaft 12.

Next, the actuator 5 will be described in detail.

Figure 5:
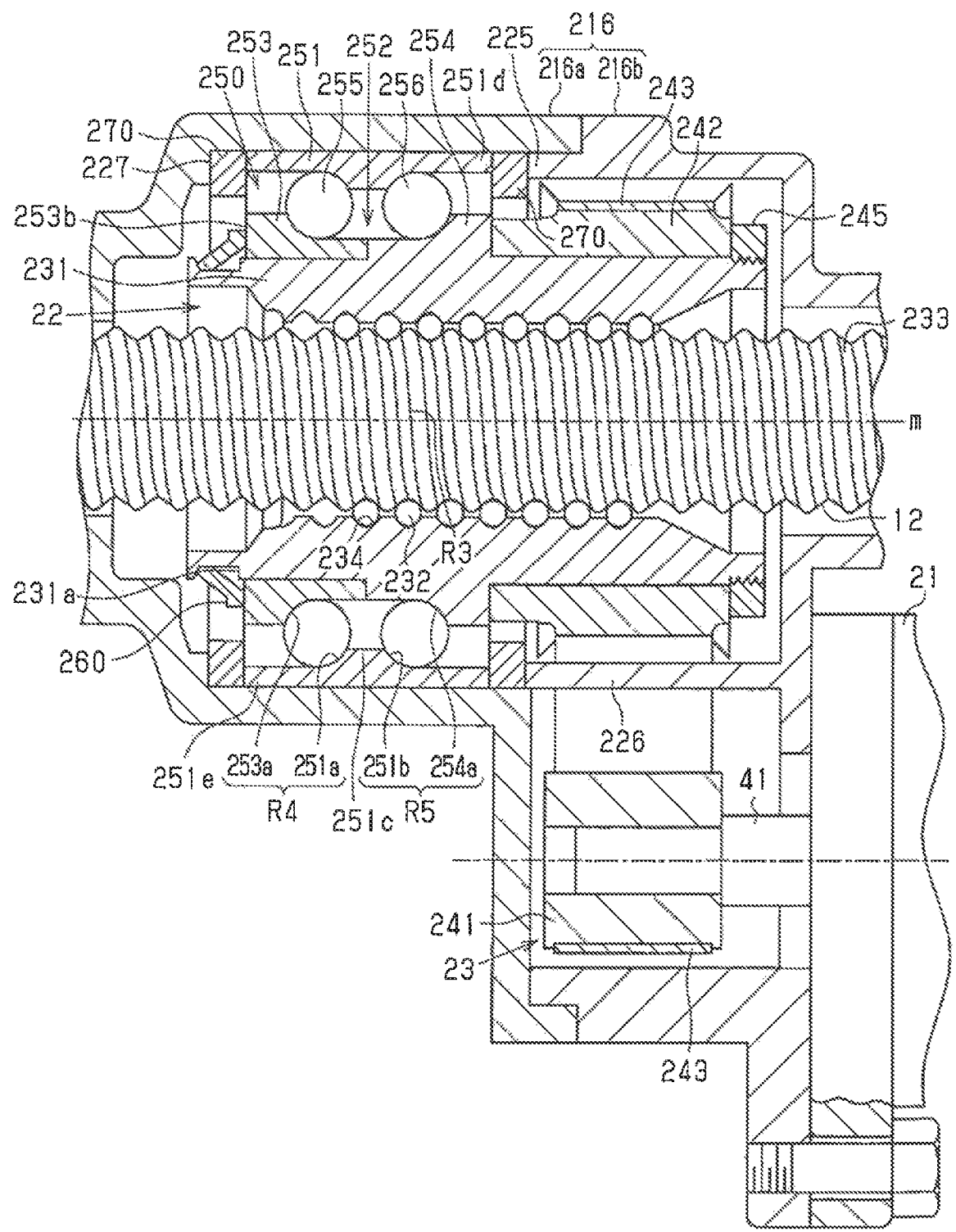
FIG. 5 is a cross-sectional view along the axial direction of a rack shaft in the vicinity of an actuator in the third embodiment.

As shown in FIG. 5, the belt mechanism 22 includes a tubular driving pulley 241, a tubular driven pulley 242, and a belt 243 looped over the driving pulley 241 and the driven pulley 242. The driving pulley 241 is attached to the rotating shaft 41 of the motor 21. The driven pulley 242 is attached to the outer periphery of a ball screw nut 231. The rotation center of the driven pulley 242 matches with the axis in of the rack shaft 12.

The ball screw mechanism 23 includes the ball screw nut 231 serving as a rotating member to be screwed onto the outer periphery of the rack shaft 12 through balls 232. The axis of the ball screw nut 231 matches with the axis m of the rack shaft 12.

A helical screw groove 234 corresponding to a screw groove 233 of the rack shaft 12 is provided on the inner peripheral surface of the ball screw nut 231. The screw grooves 233, 234 form a helical space. This space functions as the ball track R3 on which the ball 232 rolls. In addition, a circulation path (not shown) is provided in the ball screw nut 231. The circulation path opens at two places of the ball track R3 and shorts the two openings. Therefore, the plurality of balls 232 circulates endlessly in the ball track R3 through the circulation path inside the ball screw nut 231.

The ball screw nut 231 rotates around the axis m by the rotational force of the motor 21 transmitted in order of the driving pulley 241, the belt 243, and the driven pulley 242. The ball screw nut 231 rotates around its axis m as a rotation center, thereby transmitting to the rack shaft 12 the axial force that causes the rack shaft 12 to reciprocate along the axis m via the balls 232.

A rolling-element bearing 250 is provided between the inner peripheral surface of the first housing 216a and the outer peripheral surface of the ball screw nut 231. A double row angular contact ball bearing is employed as the rolling-element bearing 250. The rolling-element bearing 250 rotationally supports the ball screw nut 231.

The rolling-element bearing 250 includes a tubular outer ring 251, a tubular inner ring 252, and a plurality of first rolling elements 255 and a plurality of second rolling elements 256 disposed side by side in the axial direction between the outer ring 251 and the inner ring 252. The first rolling elements 255 and second rolling elements 256 are balls. In the rolling-element bearing 250 is provided between the inner peripheral surface of the first housing 216a and the outer peripheral surface of the ball screw nut 231 in a state where a load is applied to the outer ring 251, the inner ring 252, the first rolling elements 255, and the second rolling elements 256 so that its internal clearance has a preset size.

The outer ring 251 is provided in contact with the inner peripheral surface of the first housing 216a. An annular protrusion. 251c protruding in the radial direction is provided on the inner peripheral surface of the outer ring 251. A first outer ring rolling path 251a as a first outer peripheral track surface and a second outer ring rolling path 251b as a second outer peripheral track surface are formed on the opposite sides in the axial direction of the protrusion 251c of the outer ring 251. Each of the first outer ring rolling path 251a and the second outer ring rolling path 251b is formed in an annular shape extending along the circumferential direction. The first outer ring rolling path 251a and the second outer ring rolling path 251b are disposed side by side in the axial direction on the inner peripheral surface of the outer ring 251. The first outer ring rolling path 251a is provided on the opposite side in the axial direction of the protrusion 251c from the rack-and-pinion mechanism 18. The first rolling elements 255 are in contact with the first outer ring rolling path 251a in the radial direction. The second outer ring rolling path 251b is provided on a side of the protrusion 251c in the axial direction on which the rack-and-pinion mechanism 18 is located. The second rolling elements 256 are in contact with the second outer ring rolling path 251b in the radial direction.

The inner ring 252 is provided on the outer peripheral surface of the ball screw nut 231 so as to be rotatable integrally with the ball screw nut 231. The inner ring 252 includes a first inner ring portion 253 as a first split race and a second inner ring portion 254 as a second split race. Each of the first inner ring portion 253 and the second inner ring portion 254 is formed in a tubular shape.

An annular first inner ring rolling path 253a as a first inner peripheral track surface is formed on the outer peripheral surface of the first inner ring portion 253. The first inner ring rolling path 253a is formed at a position facing the first outer ring rolling path 251a. The first rolling elements 255 are in contact with the first inner ring rolling path 253a in the radial direction. That is, a first rolling path R4 for the first rolling elements 255 rolling along the circumferential direction is formed by the first outer ring rolling path 251a and the first inner ring rolling path 253a.

The second inner ring portion 254 is disposed side by side with the first inner ring portion 253 in the axial direction. The second inner ring portion 254 is in contact with the first inner ring portion 253 in the axial direction. An annular second inner ring rolling path 254a as a second inner peripheral track surface is formed on the outer peripheral surface of the second inner ring portion 254. The second inner ring rolling path 254a is formed at a position facing the second outer ring rolling path 251b. The second rolling elements 256 are in contact with the second inner ring rolling path 254a in the radial direction. That is, a second rolling path R5 for the second rolling elements rolling along the circumferential direction is formed by the second outer ring rolling path 251b and the second inner ring rolling path 254a.

The second inner ring portion 254 is provided integrally with the ball screw nut 231. More specifically, the second inner ring portion 254 is formed as part of the ball screw nut 231 on the outer peripheral surface of the ball screw nut 231. A lock nut 245 is threadedly engaged with the outer peripheral surface of the end of the ball screw nut 231 on the side on which the driven pulley 242 is located. The lock nut 245 fixes the driven pulley 242 between the lock nut 245 and the second inner ring portion 254 in the axial direction. As a result, the ball screw nut 231 and the driven pulley 242 are fixed so as to be rotatable together.

A groove portion 231a is provided on the outer peripheral surface of the ball screw nut 231. The groove portion 231a extends over the entire circumference of the ball screw nut 231 in the circumferential direction. The groove portion 231a is provided so as to be adjacent to the first inner ring portion 253. The groove portion 231a is positioned on the opposite side of the first inner ring portion 253 from the second inner ring portion 254.

An annular holding member 260 is fitted into the groove portion 231a inward in the radial direction. The holding member 260 is in contact with an axial end face 253b of the first inner ring portion 253 in a state of being fitted in the groove portion 231a.

The second housing 216b has locking portions 225, 226 in the opening facing the first housing 216a. The locking portion 225 faces a first end 251d (the right end in FIG. 5) in the axial direction of the outer ring 251. The locking portion 225 protrudes from the end face of the opening in the second housing 216b toward the first housing 216a. The locking portion 226 faces the first end 251d of the outer ring 251. The locking portion 226 protrudes from the inside of the second housing 216b toward the first housing 216a. The locking portion 226 extends toward the first housing 216a in a manner of pawing through the region surrounded by the belt 243. Further, the first housing 216a includes an annular locking portion 227 at a portion facing a second end 251e (the left end in FIG. 5) in the axial direction of the outer ring 251.

Elastic members 270 are each provided between the locking portion 227 of the first housing 216a and the second end 251e of the outer ring 251 and between the locking portions 225, 226 of the second housing 216b and the first end 251d of the outer ring 251. An elastic member 270 elastically supports the outer ring 251 against the load acting on the rack shaft 12. The load acting on the rack shaft 12 is a force acting along the axis m of the rack shaft 12. For example, when the driver applies the steering torque to the steering wheel 2, or when the steerable wheel 3 get over the roughness etc. of the road surface, the load is a load transmitted from the steerable wheel 3 to the rack shaft 12.

Next, the fitting of the holding member 260 into the groove portion 231a will be described in detail.

Figure 6:
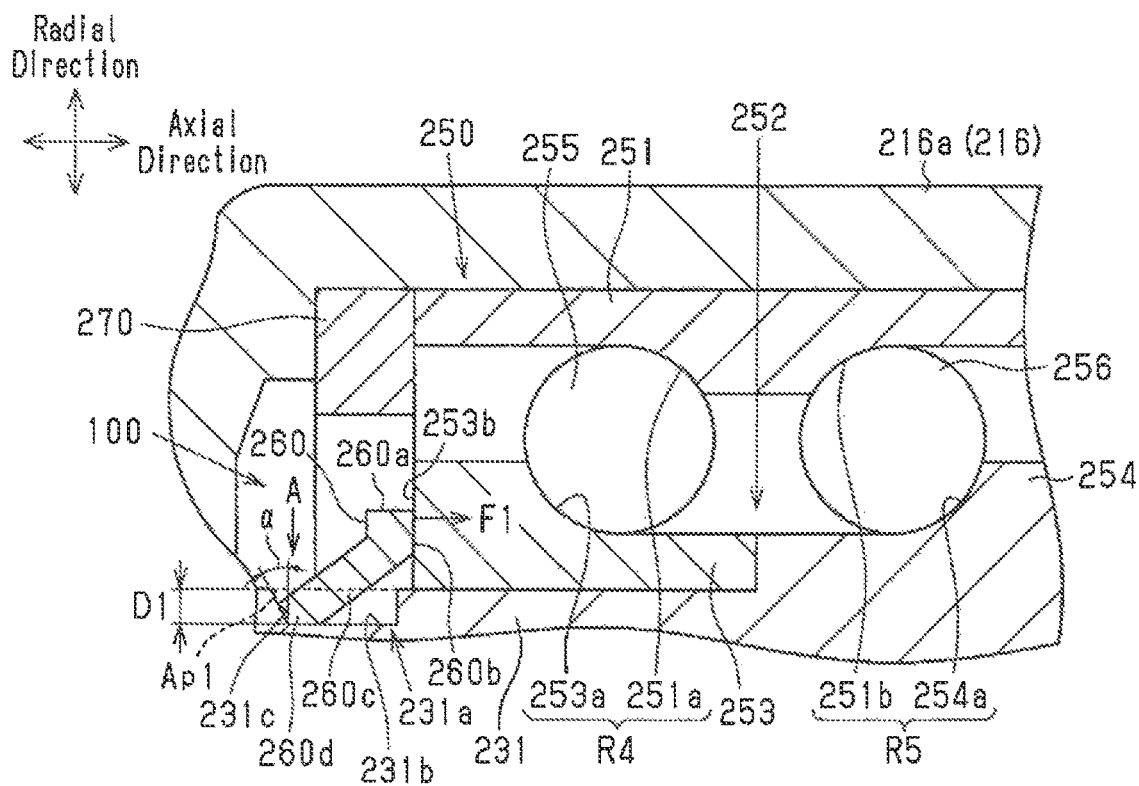
FIG. 6 is a cross-sectional view showing a state where a holding member according to the third embodiment is fitted.

As shown in FIG. 6, a stepped surface 231c is formed in a portion of the groove portion 231a opposite to the end face 253b of the first inner ring portion 253. The stepped surface 231c is a tapered surface (annular inclined surface) inclined by an inclination angle α with respect to the radial direction. Specifically, the stepped surface 231c is provided so that the width of the groove portion 231a in the axial direction increases as it goes from a bottom surface 231h of the groove portion 231a toward the outer peripheral surface of the ball screw nut 231 along the radial direction. The tapered surface is an example of an inclined surface. The width of the groove portion 231a in the axial direction is the largest at an opening Ap1 of the groove portion 231a.

The holding member 260 includes an annular plate-like contact portion 260a and a support portion 260c. The support portion 260c is formed so as to extend in the axial direction in the form of a truncated cone cylinder from the inner peripheral edge of the contact portion 260a. One end face 260b of the contact portion 260a in the thickness direction is in contact with the end face 253b of the first inner ring portion 253. The support portion 260c has a small diameter side portion 260d. The small diameter side portion 260d is fitted into the groove portion 231a of the ball screw nut 231 inward in the radial direction indicated by the arrow A. Specifically, the small diameter side portion 260d is swaged in the groove portion 231a so as to be deformed inward in the radial direction. The contact portion 260a is an example of the first end portion of the holding member 260, and the support portion 260c is an example of the second end portion of the holding member 260.

The small diameter side portion 260d is in close contact with the bottom surface 231b of the groove portion 231a and the stepped surface 231c of the groove portion 231a. As a result, the holding member 260 is in contact with the stepped surface 231c and the end face 253b of the first inner ring portion 253.

In this case, the holding member 260 applies an axial biasing force F1 to the first inner ring portion 253 via the contact portion 260a. This biasing force F1 has a magnitude enough to make the internal clearance of the rolling-element bearing 250 a predetermined size. That is, in the holding member 260 is fitted into the groove portion 231a in a state where the biasing force F1 is applied to the first inner ring portion 253, the first rolling elements 255, the outer ring 251, the second rolling elements 256, and the second inner ring portion 254 so that the internal clearance of the rolling-element bearing 250 has a predetermined size.

The above-mentioned biasing force F1 will be described. The biasing force F1 applied to the first inner ring portion 253 is determined by the amount of deformation when the small diameter side portion 260d of the support portion 260c is swaged into the groove portion 231a of the ball screw nut 231. Specifically, when the small diameter side portion 260d is swaged into the groove portion 231a, the small diameter side portion 260d is deformed toward the stepped surface 231e along the bottom surface 231b of the groove portion 231a. In a state where the contact portion 260a is in contact with the first inner ring portion 253, when the amount of deformation of the small diameter side portion 260d deformed toward the stepped surface 231c is large, the axial component of the reaction force which the holding member 260 receives from the stepped surface 231c increases. The axial component of the reaction force which the holding member 260 receives from the stepped surface 231c is applied to the first inner ring portion 253 as the biasing force F1.

The ease of withdrawing the holding member 260 from the groove portion 231a and the magnitude of the biasing force F1 vary depending on the inclination angle α of the stepped surface 231c of the groove portion 231a and the depth D1 of the groove portion 231a. Therefore, the inclination angle α and the depth D1 are set in consideration of the balance to the extent that the holding member 260 does not come out of the groove portion 231a and that the biasing force F1 can be sufficiently secured. In the third embodiment, the fixing structure 100 for fixing the inner ring to the outer periphery of the ball screw nut 231 is composed of the groove portion 231a and the holding member 260.

Operations and advantages of the third embodiment will now be described.

(4) The reason for fixing the inner ring 252 of the rolling-element bearing 250 by the holding member 260 is as follows.

(A) In order to eliminate the variation in the internal clearance of the rolling-element bearing 250, the axial force is applied to the outer ring 251, the inner ring 252, the first rolling elements 255, and the second rolling elements 256.

(B) To limit relative movement of the inner ring 252 in the axial direction with respect to the ball screw nut 231.

In this respect, in the third embodiment, even if the first inner ring portion 253 acts to move relatively in the axial direction with respect to the ball screw nut 231, the holding member 260 caught on the stepped surface 231c of the groove portion 231a limits relative movement of the first inner ring portion 253 with respect to the ball screw nut 231. Further, since the holding member 260 applies the biasing force F1 to the end face 253b of the first inner ring portion 253 in a state of being fitted in the groove portion 231a, variations in the internal clearance of the rolling-element bearing 250 can also be limited.

On the other hand, for example, when the inner ring 252 of the rolling-element bearing 250 is fixed by a lock nut, tightening the lock nut too much causes an excessive load to act on the inner ring 252 and the ball screw nut 231, whereby the inner ring 252 and the screw groove 233 of the ball screw nut 231 may be deformed. In addition, in order to tighten the lock nut to satisfy the following conditions (C) to (E), it is necessary to finely adjust the tightening torque of the lock nut, which takes time and labor.

(C) To limit deformation of the inner ring 252 and the ball screw nut 231.

(D) To limit variations in the internal clearance of the rolling-element bearing 250.

(E) To limit a relative movement of the inner ring 252 in the axial direction with respect to the ball screw nut 231.

Even if the lock nut is tightened toward the inner ring 252 with the adjusted tightening torque, the lock nut may loosen toward the opposite side from the inner ring 252 due to vibration from the outside or the like.

In this respect, in the third embodiment, the first inner ring portion 253 is fixed and the holding member 260 is fitted into the groove portion 231a inward in the radial direction only by fitting the holding member 260 into the groove portion 231a. As a result, separation of the holding member 260 from the groove portion 231a is limited. Therefore, in the third embodiment, it is possible to easily fix the inner ring 252 while limiting the deformation of the inner ring 252 of the rolling-element bearing 250. Further, in the third embodiment, there is no possibility that an excessive load acts on the first inner ring portion 253 due to excessive tightening of the lock nut. Therefore, deformation of the screw groove 233 of the ball screw nut 231 can also be limited.

(5) The stepped surface 231 is an inclined surface provided so that the width of the groove portion 231a in the axial direction increases as it goes from the bottom surface 231b of the groove portion 231a toward the outer peripheral surface of the ball screw nut 231 along the radial direction. Therefore, when swaging the small diameter side portion 260d of the support portion 260c so as to be brought into close contact with the stepped surface 231c, the small diameter side portion 260d is easily guided inside the groove portion 231a by the stepped surface 231c. Therefore, it is easy to swage the small diameter side portion 260d against the groove portion 231a.

(6) By swaging the small diameter side portion 260d of the support portion 260c over the entire circumference of the groove portion 231a, it is possible to more uniformly fix the inner ring 252 along the axial direction.

Fourth Embodiment

A steering device according to a fourth embodiment will now be described with reference to FIG. 7. For illustrative purposes, the same reference numerals are given to those components that the same as the corresponding component of the third embodiment and detailed explanations are omitted.

Figure 7:
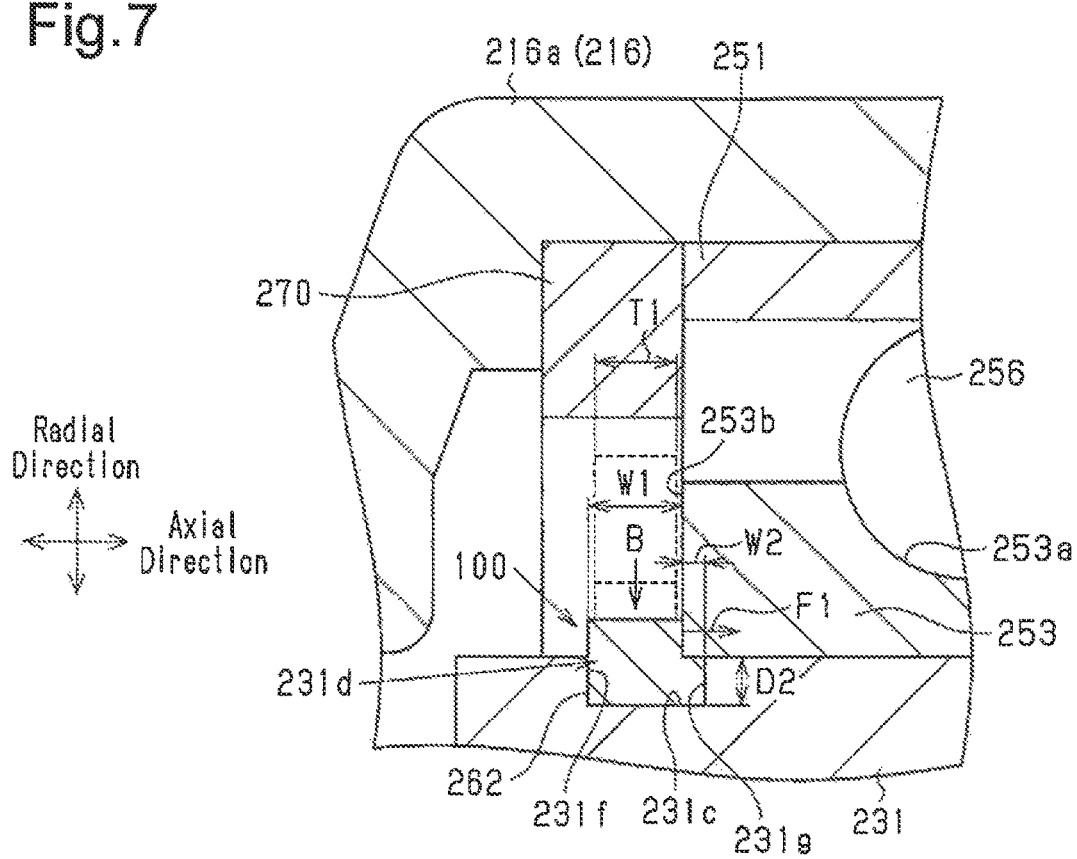
FIG. 7 is a cross-sectional view showing a state where a ring member according to a fourth embodiment is fitted.

As shown in FIG. 7, a groove portion 231d is provided on the outer peripheral surface of the ball screw nut 231. The groove portion 231d extends over the entire circumference of the ball screw nut 231 in the circumferential direction. The groove portion 231d is provided so as to be adjacent to the first inner ring portion 253. The groove portion 231d is located on the opposite side of the first inner ring portion 253 from the second inner ring portion 254. The g groove portion 231d has a bottom surface 231e, a stepped surface 231f facing the end face 253b of the first inner ring portion 253, and a second stepped surface 231g opposite to the stepped surface 231f.

An annular ring member 262 as a holding member is fitted into the groove portion 231d of the ball screw nut 231. The ring member 262 is swaged so as to be deformed inward in the radial direction indicated by an arrow B with respect to the groove portion 231d.

As a result, the ring member 262 in close contact with the bottom surface 231e, the stepped surface 231f, and a portion (the lower portion in FIG. 7) of the end face 253b of the first inner ring portion 253. That is, in a state where the ring member 262 is swaged in the groove portion 231d of the ball screw nut 231, the ring member 262 is in contact with the stepped surface 231f and the end face 253b. In a state where the ring member 262 is swaged in the groove portion 231d, the ring member 262 also enters a portion where the first inner ring portion 253 in the groove portion 231d overlaps in the axial direction. The stepped surface 231f is provided so as to be orthogonal to the bottom surface 231e of the groove portion 231d, and is not inclined with respect to the radial direction.

In addition, the ring member 262 is swaged into the groove portion 231d of the ball screw nut 231 in a state where the biasing force F1 in the axial direction is applied to the first inner ring portion 253 as in the third embodiment.

As shown by a broken line in FIG. 7, the ring member 262 has a rectangular cross section when cut along the axial direction before being fitted into the groove portion. 231d. The ring member 262 has a predetermined thickness T1 in the axial direction before being swaged into the groove portion 231d.

The width of the groove portion 231d in the axial direction is the sum of the width W1 from the stepped surface 231f to the end face 253b and the width W2 from the end face 253b to the second stepped surface 231g of the groove portion 231d. The width W1 is sufficiently larger than the width W2. The width W1 is set larger than the thickness T1 of the ring member 262 before swaging. The portion corresponding to the width W2 functions as an escape groove allowing deformation in the axial direction of the ring member 262 when the ring member 262 is swaged into the groove portion 231d.

The ease of withdrawing from the groove portion 231d of the ring member 262, the magnitude of the biasing force F1 applied by the ring member 262 to the first inner ring portion 253, and the ease of insertion of the ring member 262 into the groove portion 231d vary depending on the width W1 of the groove portion 231d, the thickness T1 of the ring member 262 before swaging, and the depth D2 of the groove portion 231d. Therefore, the width W1, the thickness T1, and the depth D2 are set in consideration of balance to the extent that the ring member 262 does not come out of the groove portion 231d, it is possible to sufficiently secure the biasing force F1 applied to the first inner ring portion 253 by the ring member 262, and it is possible to sufficiently secure the insertability of the ring member 262 into the groove portion 231d. In the fourth embodiment, the fixing structure 100 for fixing the inner ring to the outer periphery of the ball screw nut 61 is composed of the ring member 262 and the groove portion 231d.

The fourth embodiment achieves the same operations and advantages as the items (4) and (6) of the third embodiment.

Fifth Embodiment

A steering device according to a fifth embodiment will now be described with reference to FIGS. 8 to 9. For illustrative purposes, the same reference numerals are given to those components that the same as the corresponding components of the third embodiment and detailed explanations are omitted.

Figure 8:
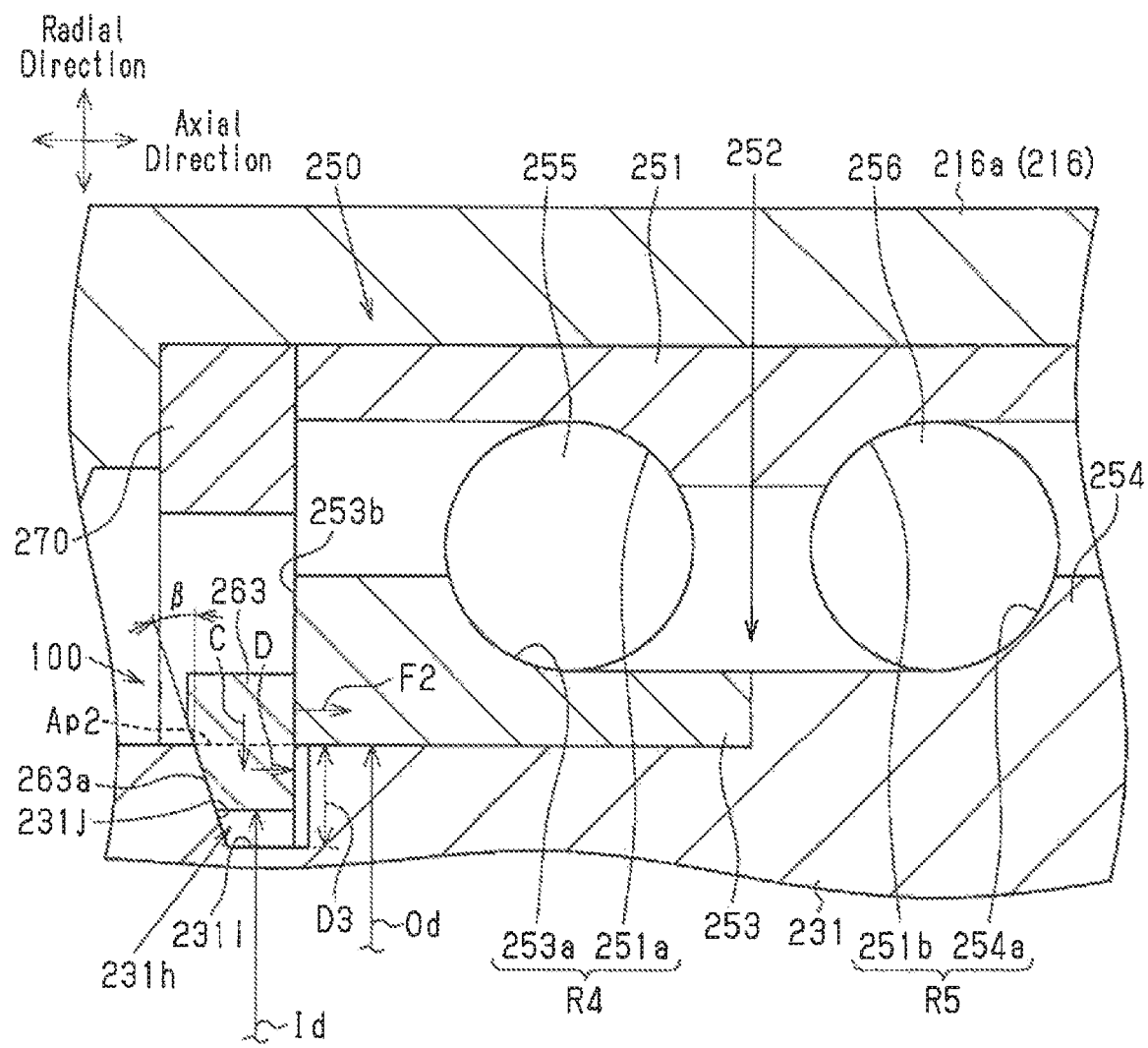
FIG. 8 is a cross-sectional view showing a state where a snap ring according to a fifth embodiment is fitted.

As shown in FIG. 8, a groove portion 231h is provided on the outer peripheral surface of the ball screw nut 231. The groove portion 231h extends over the entire circumference of the ball screw nut 231 in the circumferential direction. The groove portion 231h is provided so as to be adjacent to the first inner ring portion 253. The groove portion 231h is positioned on the opposite of the first inner ring portion 253 from the second inner ring portion 254. A stepped surface 231j is formed in a portion of the groove portion 231h facing the end face 253b of the first inner ring portion 253. The stepped surface 231j is a tapered surface (annular inclined surface) inclined by an inclination angle β with respect to the radial direction. Specifically, the stepped surface 231j is a first inclined surface provided so that the width of the groove portion 231h in the axial direction increases as it goes from a bottom surface 231i of the groove portion 231h toward the outer peripheral surface of the ball screw nut 231 along the radial direction. The width of the groove portion 231h in the axial direction is largest at an opening Ap2 of the groove portion 231h. The end of the first inner ring portion 253 opposite to the second inner ring portion 254 overlaps with the groove portion 231h by a predetermined amount in the axial direction.

A snap ring 263 as a holding member is fitted in the groove portion 231h of the ball screw nut 231. A second inclined surface 263a corresponding to the stepped surface 231j of the groove portion 231h is formed on the end face of the snap ring 263 opposite to the first inner ring portion 253.

Figure 9:
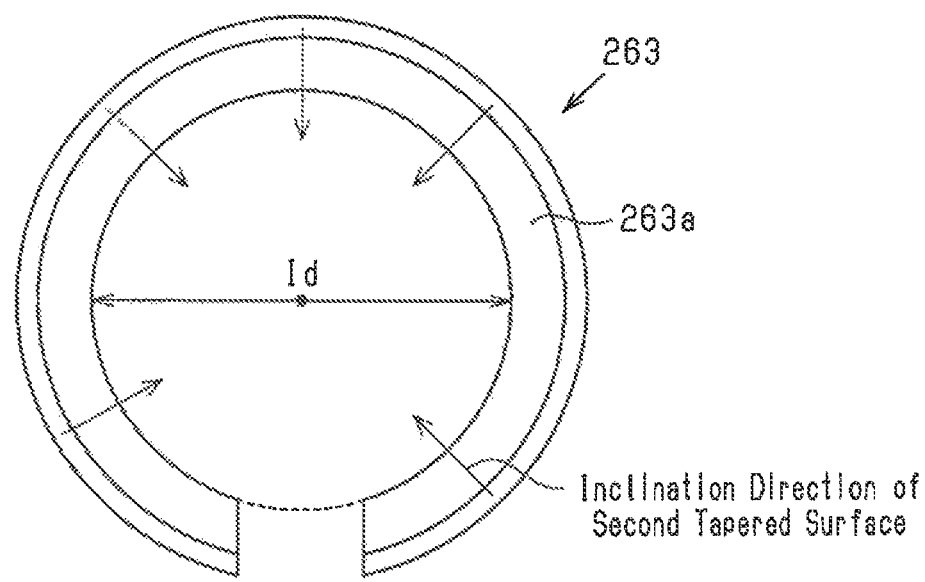
FIG. 9 is a front view of the snap ring according to the fifth embodiment.

As shown in FIGS. 8 and 9, the snap ring 263 has a C-shape in which part of the annular ring member is cut out. The inner diameter Id of the imaginary circle formed by the inner peripheral edge of the snap ring 263 is set to be smaller than the outer diameter Od of the outer peripheral surface of the ball screw nut 231 in a state where the snap ring 263 is not fitted in the groove portion 231h.

The second inclined surface 263a is in contact with the stepped surface 231j of the groove portion 231h in a state where the snap ring 263 is fitted in the groove portion 231h. A clearance is formed between the inner peripheral edge of the snap ring 263 and the bottom surface 231i of the groove portion 231h. The end face of the snap ring 263 facing the first inner ring portion 253 is in contact with the end face 253b of the first inner ring portion 253.

In this case, the snap ring 263 applies an axial biasing force F2 to the first inner ring portion 253. The biasing force F2 has a magnitude enough to make the internal clearance of the rolling-element bearing 250 have a predetermined size. That is, in the snap ring 263 is fitted into the groove portion 231h in a state where the biasing force F2 is applied to the first inner ring portion 253, the first rolling elements 255, the outer ring 251, the second rolling elements 256, and the second inner ring portion 254 so that the internal clearance of the rolling-element bearing 250 has a predetermined size.

The above-mentioned biasing force F2 will be described.

Since the inner diameter Id of the snap ring 263 is set to be smaller than the outer diameter Od of the ball screw nut 231, the snap ring 263 is fitted so as to be displaced inward in the radial direction indicated by an arrow C with respect to the groove portion 231h. Specifically, the snap ring 263 is fitted into the groove portion 231h so that the snap ring 263 reduces its diameter toward the bottom surface 231i of the groove portion 231h. Since the second inclined surface 263a is in contact with the stepped surface 231j, the snap ring 263 is axially displaced in the direction indicated by the arrow D, that is, toward the first inner ring portion 253 by its force acting to reduce the diameter. When the snap ring 263 is sandwiched between the end face 253b of the first inner ring portion 253 and the stepped surface 231j of the groove portion 231h, fitting of the snap ring 263 into the groove portion 231h is stopped. At this time, since a clearance is formed between the inner peripheral edge of the snap ring 261 and the bottom surface 231i of the groove portion 231h, the snap ring 263 acts to be displaced inward in the radial direction so that the diameter thereof reduces. That is, the snap ring 263 acts to be displaced toward the first inner ring portion 253 along the axial direction. The end face of the snap ring 263 is pressed against the end face 253b of the first inner ring portion 253 by the force by which the snap ring 263 acts to be displaced toward the first inner ring portion 253. The force by which the snap ring 263 acts to be displaced toward the first inner ring portion 253 is applied to the first inner ring portion 253 as the biasing force F2.

The ease of withdrawing of the snap ring 263 from the groove portion 231h, and the magnitude of the biasing force F2 applied by the snap ring 263 to the first inner ring portion 253 vary depending on the inclination angle β of the stepped surface 231j of the groove portion 231h, and the depth D3 of the groove portion 231h. Therefore, the inclination angle β and the depth D3 are set in consideration of the balance to the extent that the snap ring 263 does not come out of the groove portion 231h and that the snap ring 263 can sufficiently secure the biasing force F2 applied to the first inner ring portion 253. In the fifth embodiment, the fixing structure 100 for fixing the inner ring to the outer periphery of the ball screw nut 231 is composed of the snap ring 263 and the groove portion 231h.

The fifth embodiment achieves the same operation and advantage as the item (4) of the third embodiment.

The above-described first to fifth embodiments may be modified as follows. The first to fifth embodiments and the following modifications can be combined as long as the combined modifications remain technically consistent with each other.

In the first and second embodiments, the first split races 81, 131 are formed so that the axial range L1, in which the first inner peripheral track surfaces 86, 134 are present, and the axial range L2, in which the internal thread portions 88, 135 are present, overlap with each other in the axial direction.

Figure 10:
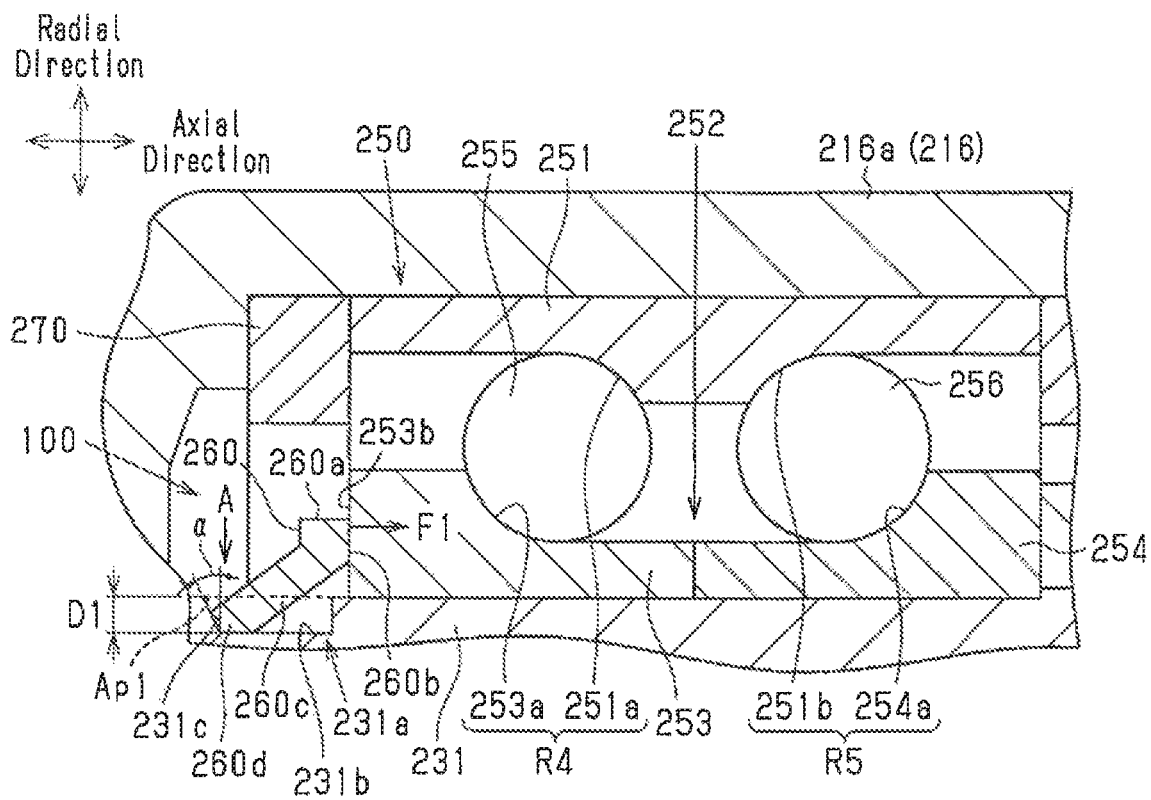
FIG. 10 is a cross-sectional view showing a state where a holding member according to a modification is fitted.

In the first embodiment, the inner ring 72 of the rolling-element bearing 71 is composed of the first split race 81 and the second split race portion 82 of the ball screw nut 61. However, the configuration is not limited thereto, and a second split race having a second inner peripheral track surface 83 may be provided separately from the ball screw nut 61. In this case, the inner ring is composed of the first split race 81 and the second split race. Further, in the third embodiment, both the first inner ring portion 253 and the second inner ring portion 254 may be provided separately from the ball screw nut 231 as shown in FIG. 10. Likewise, in the fourth and fifth embodiments, both the first inner ring portion 253 and the second inner ring portion 254 may be provided separately from the ball screw nut 231.

In the second embodiment, the inner ring 122 has the first and second split races 131, 132. However, the configuration is not limited thereto, and the second split race portion having the second inner peripheral track surface 136 may be formed integrally with the outer periphery of the driven pulley 101. In this case, the inner ring is composed of the first split race 131 and the second split race portion.

In the first and second embodiments, balls are employed as the first and second rolling elements 74, 75, 124, 125, 255, and 256. However, the configuration is not limited to this. For example, a conical roller or the like may be employed, and its shape can be appropriately changed.

In the first to fifth embodiments, the power transmission mechanism is composed of the belt mechanism 22 and the ball screw mechanism 23. However, the configuration is not limited to this. For example, the power transmission mechanism may be composed of a gear mechanism that transmits rotation to the ball screw nuts 61, 111 by gears, and the ball screw mechanism 23.

In the third embodiment, the small diameter side portion 260d of the support portion 260e is swaged into the groove portion 231a over the entire circumference in the circumferential direction, but the configuration is not limited to this. For example, the small diameter side portion 260d of the support portion 260c may be intermittently swayed along the circumferential direction. At this time, the groove portion 231a may also be provided intermittently in accordance with the swaged portion of the small diameter side portion 260d.

In addition, when the groove portion 231a is provided at multiple positions along the circumferential direction, the stepped surface 231c of the groove portion 231a is an inclined surface inclined by the inclination angle α in the radial direction, but the configuration is not limited thereto. For example, the inclination angle α may be set to 0, and the stepped surface 231c may be a stepped surface along the radial direction.

In the third to fifth embodiments, the second inner ring portion 254 is integrally provided on the outer peripheral surface of the ball screw nut 231, but the configuration is not limited thereto. For example, the first inner ring portion 253 may be provided integrally with the outer peripheral surface of the ball screw nut 231, and the second inner ring portion 254 may be provided separately from the ball screw nut 231. In this case, a change to the following form is made. For example, the third embodiment will be described as an example.

Figure 11:
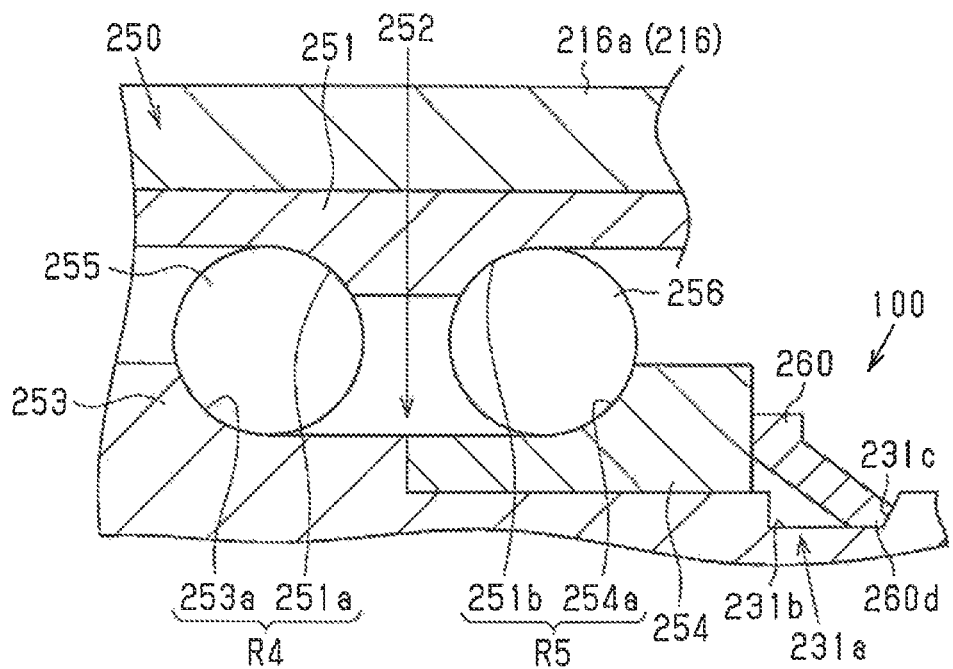
FIG. 11 is a cross-sectional view showing positions of the holding member and a groove portion according to a modification.

As shown in FIG. 11, the groove portion 231a is changed to be provided on the opposite side of the second inner ring portion 254 of the inner ring 252 from the first inner ring portion 253. Even with such a modification, the same effects as those of the third embodiment can be obtained. In the fourth embodiment and the fifth embodiment, similar changes are also implemented.

In the third to fifth embodiments, the description is made by embodying the rotating member as a ball screw nut 231. However, the rotating member may be embodied as the driven pulley 242, for example.

Specifically, the outer peripheral surface of the ball screw nut 231 is a tubular surface having a constant diameter along the axis m. The driven pulley 242 is fitted over the entire length of the outer peripheral surface of the ball screw nut 231 in the axial direction. When the first inner ring portion 253 and the second inner ring portion 254 are integrated with the rotating member, one of them is integrally provided on the outer peripheral surface of the driven pulley 242. When the first inner ring portion 253 and the second inner ring portion 254 are not integrated with the rotating member, both are provided separately from the driven pulley 242.

In the first to fifth embodiments, the EPS 1 is embodied in which the rotating shaft 41 of the motor 21 and the rack shaft 12 are present on different axes parallel to each other, but the EPS 1 may be embodied in which the rotating shaft 41 and the rack shaft 12 are present coaxially.

In the first to fifth embodiments, the steering device is embodied in the EPS 1, but it may be embodied in a steer-by-wire type steering device, for example.

The invention claimed is:

1. A steering device configured to apply an assisting force to a steering mechanism by a motor, the steering device comprising:
   a housing;
   a steering rod accommodated in the housing to be allowed to reciprocate in an axial direction;
   a power transmission mechanism, which includes a rotating member configured to rotate by the motor and is configured to convert a rotation of the rotating member into a reciprocating motion of the steering rod thereby to transmit the reciprocating motion to the steering rod; and
   a rolling-element bearing, which rotationally supports the rotating member in the housing, wherein
   the rolling-element bearing includes an inner ring, an outer ring, first rolling elements, and second rolling elements,
   the first rolling elements and the second rolling elements are disposed side by side in an axial direction between the inner ring and the outer ring,
   the inner ring includes
      a first split race having a first inner peripheral track surface, on which the first rolling elements roll, and
      a second split race having a second inner peripheral track surface, on which the second rolling elements roll,
   the steering device further includes a fixing structure configured to fix the rolling-element bearing to an outer periphery of the rotating member in a state where a load in the axial direction is applied to the first split race, the first rolling elements, the outer ring, the second rolling elements, and the second split race,
   the fixing structure includes
      a groove portion provided so as to be adjacent to the rolling-element bearing on an outer peripheral surface of the rotating member, and
      a holding member fitted into the groove portion, and
   in a state where the holding member is in contact with an end face of the inner ring and a stepped surface of the groove portion facing the end face to apply a biasing force in the axial direction to the end face of the inner ring, the holding member is fitted to the groove portion toward an inner side in a radial direction orthogonal to the axial direction.

2. The steering device according to claim 1, wherein the holding member includes a first end portion, which contacts the end face of the inner ring, and
   a second end portion, which is in close contact with the stepped surface by being swaged into the groove portion so as to be deformed inward in the radial direction.

3. The steering device according to claim 2, wherein the stepped surface is an inclined surface provided such that a width of the groove portion in the axial direction increases from a bottom surface of the groove portion toward the outer peripheral surface of the rotating member.

4. The steering device according to claim 2, wherein
   the groove portion is provided over an entire outer peripheral surface of the rotating member in a circumferential direction, and
   the holding member is annularly formed and is fitted over an entire circumference of the groove portion.

5. The steering device according to claim 1, wherein
   the groove portion is provided over the entire outer peripheral surface of the rotating member in a circumferential direction,
   the stepped surface is an annular first inclined surface provided such that a width of the groove portion in the axial direction increases from a bottom surface of the groove portion toward the outer peripheral surface of the rotating member along the radial direction,
   the holding member is a C-shaped snap ring,
   the holding member has an annular second inclined surface corresponding to the first inclined surface, and
   an end of the inner ring overlaps with the groove portion by a predetermined amount in the axial direction.

6. The steering device according to claim 1, wherein
   the power transmission mechanism includes a ball screw mechanism that converts the rotation of the motor into the reciprocating motion of the steering rod,
   the ball screw mechanism includes a ball screw nut to which the rotation of the motor is transmitted, and
   the rotating member is the ball screw nut.

7. The steering device according to claim 1, wherein
   the power transmission mechanism includes
      a belt mechanism, which a driving pulley connected to the motor and a driven pulley to which the rotation of the driving pulley is transmitted via a belt, and
      a ball screw mechanism, which converts the rotation of the motor into the reciprocating motion of the steering rod,
   the ball screw mechanism includes a ball screw nut that is connected to the driven pulley to be integrally rotational with the driven pulley, and
   the rotating member is the driven pulley.

8. The steering device according to claim 1, wherein the second split race is integrally formed with the rotating member.

9. A steering device configured to apply an assisting force to a steering mechanism by a motor, the steering device comprising:
   a housing;
   a steering rod accommodated in the housing to be allowed to reciprocate in an axial direction;
   a power transmission mechanism, which includes a rotating member configured to rotate by the motor and is configured to convert a rotation of the rotating member into a reciprocating motion of the steering rod thereby to transmit the reciprocating motion to the steering rod; and
   a rolling-element bearing, which rotationally supports the rotating member in the housing, wherein the rolling-element bearing includes an inner ring, an outer ring, first rolling elements, and second rolling elements, the first rolling elements and the second rolling elements are disposed side by side in an axial direction between the inner ring and the outer ring, the inner ring includes
- a first split race having a first inner peripheral track surface, on which the first rolling elements roll, and
- a second split race having a second inner peripheral track surface, on which the second rolling elements roll, the first split race includes an internal thread portion, the rotating member includes an external thread portion, onto which the internal thread portion is screwed, the rolling-element bearing is fixed to an outer periphery of the rotating member in a state where the first split race is screwed to the rotating member so that a load in the axial direction is applied to the first split race, the first rolling elements, the outer ring, the second rolling elements, and the second split race.

10. The steering device according to claim 9, wherein the first split race is formed such that an axial range in which the first inner peripheral track surface is present and an axial range in which the internal thread portion is present do not overlap with each other in the axial direction.

11. A steering device configured to apply an assisting force to a steering mechanism by a motor, the steering device comprising:
   a housing;
   a steering rod accommodated in the housing to be allowed to reciprocate in an axial direction;
   a power transmission mechanism, which includes a rotating member configured to rotate by the motor and is configured to convert a rotation of the rotating member into a reciprocating motion of the steering rod thereby to transmit the reciprocating motion to the steering rod; and
   a rolling-element bearing, which rotationally supports the rotating member in the housing, wherein the rolling-element bearing includes an inner ring, an outer ring, first rolling elements, and second rolling elements, the first rolling elements and the second rolling elements are disposed side by side in an axial direction between the inner ring and the outer ring, the inner ring includes
- a first split race having a first inner peripheral track surface, on which the first rolling elements roll, and
- a second split race having a second inner peripheral track surface, on which the second rolling elements roll, the rotating member has an outer peripheral surface provided with a groove portion adjacent to the rolling-element bearing, and the steering device further includes a holding member, which is fitted to the groove portion toward an inner side in a radial direction orthogonal to the axial direction in a state where the holding member is in contact with an end face of the inner ring and a stepped surface of the groove portion facing the end face to apply a biasing force in the axial direction to the end face of the inner ring.

* * * * *